Dec. 24, 1968 T. A. FYFE ET AL 3,418,641

ELECTRICAL DISTRIBUTION SYSTEM

Filed Oct. 29, 1964 4 Sheets-Sheet 1

INVENTORS
THOMAS A. FYFE
PAUL E. STUCKERT

BY S. P. Tedesco

ATTORNEY

United States Patent Office 3,418,641

Patented Dec. 24, 1968

3,418,641

ELECTRICAL DISTRIBUTION SYSTEM

Thomas A. Fyfe, South Plainfield, N.J., and Paul E. Stuckert, Katonah, N.Y., assignors to International Business Machines Corporation, Armonk, N.Y., a corporation of New York Filed Oct. 29, 1964, Ser. No. 407,457
20 Claims. (Cl. 340—173)

ABSTRACT OF THE DISCLOSURE

A system is described for distributing broadband electrical signals from a single source to a plurality of load devices, arranged either in series or shunt, with minimal distortion. Such system comprises a transmission line structure which is electrically tapered such that the characteristic impedances of the line sections interconnecting sucessive load devices vary monotomically as a function of distance from the signal source and each is terminated in a matched impedance. More particularly, each line section is terminated in a matched impedance by the electrical combination of the driven load and the input impedance of the next successive line section, which is properly matched.

This invention relates to electrical distribution systems and, more particularly, to electrical distribution systems wherein substantially uniform broadband electrical signals down to and including DC are supplied by a single source to a plurality of load devices. This invention finds particular application in high speed memory matries for providing substantially uniform drive signals to a plurality of memory elements that include threshold-type storage devices.

The problem of distributing uniform electrical signals from a single source to a plurality of load devices exists, for example, in high-speed memories employing threshold-type storage elements, e.g., tunnel diodes, etc. As speed and capacity requirements are increased, the need for improved signal distribution within a memory matrix becomes paramount. Increased speed requirements necessitate the use of drive pulses of short duration for the read, write, and where applicable, interrogate operations. Also, increased capacity requirements dictate that the electrical length of drive lines be correspondinly increased since a finite space along a drive line is required for each memory location. In the present art, the practical electrical length of drive lines and, also, the number of storage elements to be driven therealong are limited in applications involving high-speed operation, i.e., access and cycle times in the nanosecond range.

In present day memory matrices, storage elements are disposed as loads along a drive line forming a transmission line wherein the individual line sections connecting adjacent devices have a same characteristic impedance. Since each such line section is not properly terminated, reflections occur at each load junction along the transmission line. These reflections of the drive signal propagate until they are dissipated and a finite time is required for the system to normalize to the point where a uniform drive signal is applied to each storage element. Therefore, access and cycle times of large capacity memory matrices are increashed by the finite time required for the distribution system to normalize. This normalization time may be many times greater than the switching speed of the storage elements; also, for reliable operation, the duration of the drive signals must exceed the normalization time of the distribution system. Further, in some cases, reflections may augement the impressed signal from the source and may, thus, have a deleterious effect on system tolerances. As the computer art develops, the need for providing large capacity memories of fast access and cycle times becomes more pressing.

Accordingly, present day distribution systems limit the operational speeds as well as the capacities of memory matrices. It is evident that access and cycle times can be reduced and, also, the capacity of a memory matrix can be concurrently increased if the normalization time of the distribution system is substantially reduced and drive signals are propagated therealong substantially undistorted. In such event, the duration of such drive signals need only slightly exceed the switching time of the storage device.

Accordingly, one object of this invention is to provide an electrical distribution system whereby broadband signals can be supplied to a plurality of loads undistorted.

Another object of this invention is to provide a distribution system for memory matrices whereby distortion of drive signals provided to a plurality of memory cells is minimal.

Another object of this invention is to provide a memory matrix having fast access and cycle times and, also, large capacity.

Another object of this invention is to provide for the distribution of electrical signals along a transmission line to a plurality of loads with minimum distortion.

In accordance with this invention, these and other objects and advantages are achieved by providing that each line section of the distribution system exhibits a predetermined characteristic impedance such that each line section is terminated in a matched impedance. When each line section is thus properly terminated, no reflections appear at the load junctions or at the end of the transmission line. More particularly, the characteristic impedances of the successive line sections are designated so that, in combination with the driven loads, all lines sections driving such loads are terminated in matched impedances. For example, in a distribution system for driving a plurality of resistive shunt loads, the respective characteristic impedances of adjacent line sections of the distribution system continuous at a load junction is given by the expression:

$$Z_x = \frac{R_x Z_{x+1}}{R_x + Z_{x+1}}$$

where $Z_x$ is the characteristic impedance of the driving line section, $R_x$ is the impedance of the driven load, and $Z_{x+1}$ is the characteristic impedance of the succeeding line section. Since the succeeding line section is also properly terminated, each line section is terminated in a matched impedance and there are no reflections at the load junction. Also, in a distribution system for driving a plurality of series resistive loads, the characteristic impedance of any line section is determined by the expression:

$$Z_x = R_x + Z_{x+1}$$

where the definitions given above apply. In both the shunt and series loading arrangements, each driving line section is properly terminated in a matched impedance whereby reflections at each load junction are eliminated and normalization time of the distribution system is essentially reduced to zero. Accordingly, the duration of drive signals applied to a memory matrix can be substantially reduced whereby the access and cycle times are reduced and/or the capacity of such matrix can be increased. As hereinafter further described, certain stray reactances associated with the individual loads spaced along the distribution system may also be compensated. When the characteristic impedances of the line sections of the distribution system are determined in accordance with this invention and when the loads are equal and equally spaced, the respective characteristic impedances of line sections in the shunt loading arrangement vary hyperbolically and in the series loading arrangement vary linearly as a function of the distance along the transmission line from the driving source.

The foregoing and other objects, features, and advantages of the invention will be apparent from the following more particular description of preferred embodiments of the invention, as illustrated in the accompanying drawings.

Figure 3A:
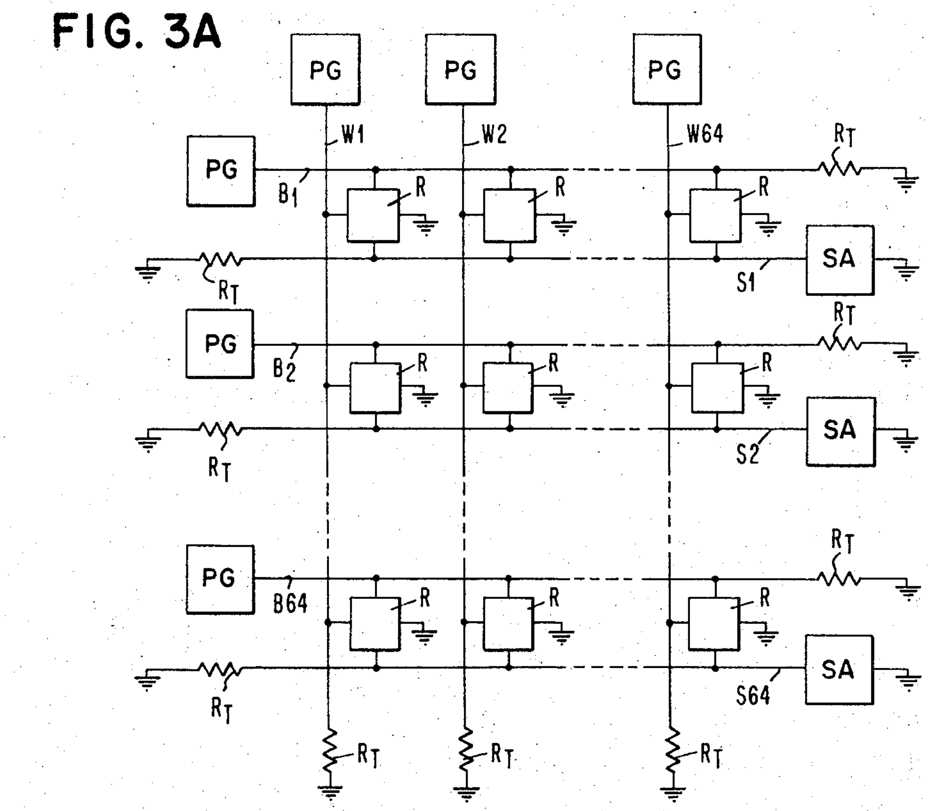
Figure 3B:
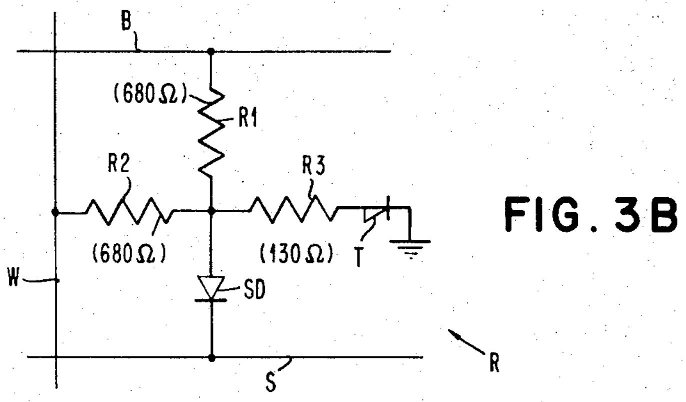
Figure 3C:
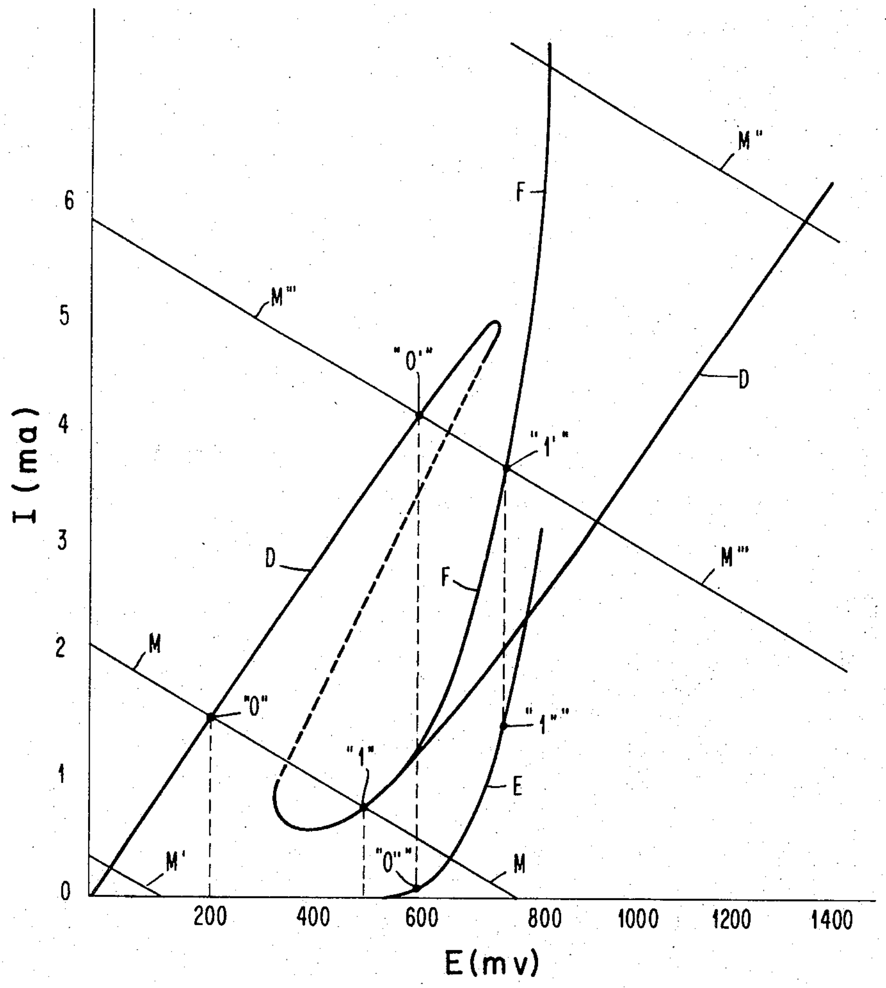
Figure 3D:
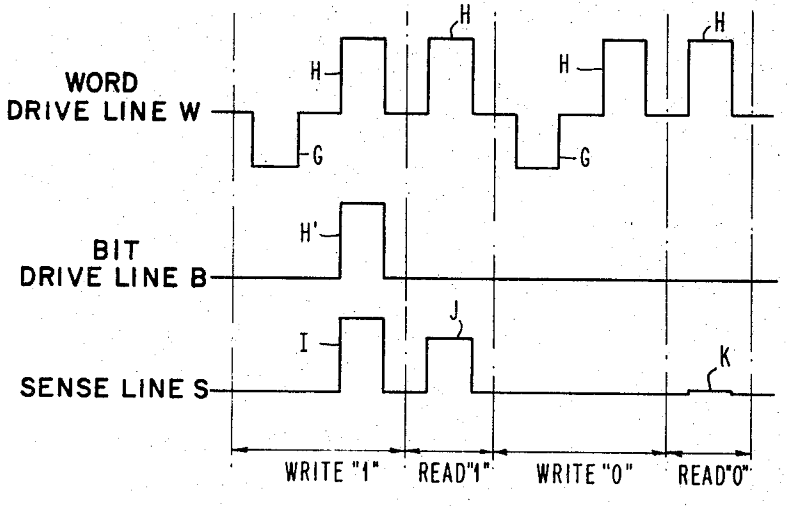

FIG. 3A is a memory matrix system embodying the distribution system of this invention; FIG. 3B is a schematic illustration of a tunnel diode memory cell; FIG. 3C illustrates the current-voltage characteristic of the memory cell of FIG. 3B; FIG. 3D illustrates the drive pulse sequence in the operation of the memory matrix of FIG. 3A.

FIGS. 4A and 4B, 5A and 5B, 6A and 6B, 7A and 7B, 8A and 8B illustrate various transmission line structures which may be employed in the practice of this invention.

Figures 1A, 1B, 2A, 2B:
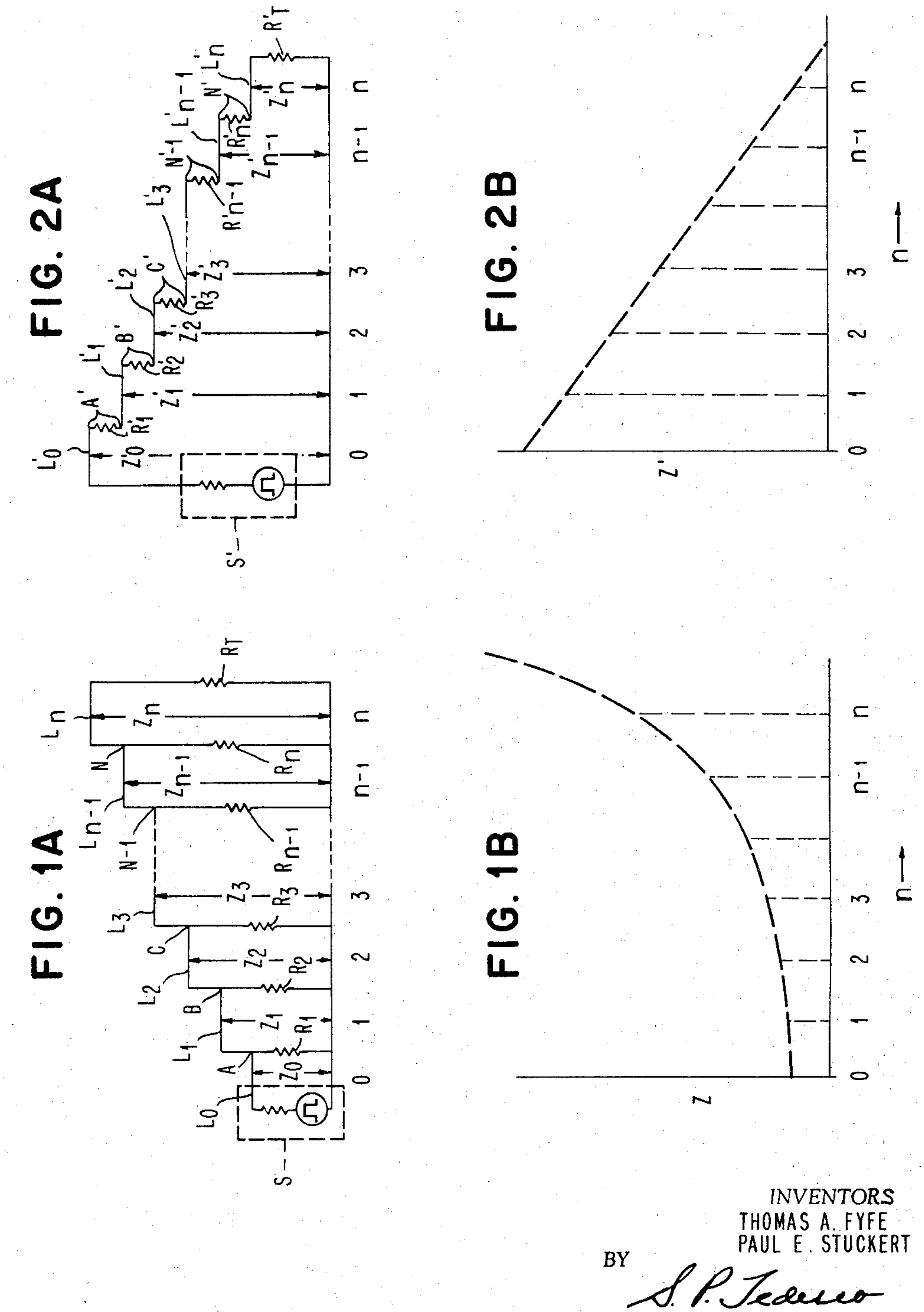
FIG. 1A is a schematic illustration of an electrical distribution system in accordance with this invention for driving a plurality of shunt resistive loads.
FIG. 1B illustrates the envelope of the characteristic impedances of the individual line sections of the system of FIG. 1A when the driven loads are of the same impedance and equally spaced therealong.
FIG. 2A is a schematic illustration of an electrical distribution system in accordance wth this invention for driving a plurality of series resistance loads.
FIG. 2B illustrates the envelope of the characteristic impedances of the individual line sections of the system of FIG. 2A when the driven loads are, of the same impedance and equally spaced therealong.

The principles of this invention can best be understood by reference to FIGS. 1A and 2A which schematically illustrate distribution systems for driving a plurality of shunt and series loads, respectively. As it is difficult to achieve nonreactive, or purely resistive, loads in a distribution system, the design of such systems with respect to the characteristic impedance of each line section can also compensate for certain stray reactances associated with the loads in the system. For example, stray, or parasitic, capacitance normally associated with each of the shunt resistive loads of FIG. 1A and stray inductance normally associated with each of the series resistance loads of FIG. 2A can be compensated by proper design of the individual line sections, as hereinafter described. When such additional compensation of reactances is provided, conditions are again established whereby an electrical signal is propagated substantially undistorted along the entire length of the distribution systems of FIGS. 1A and 2A.

Referring to FIG. 1A and disregarding stray reactances, a distribution system comprises a plurality of line sections each comprising a length of a transmission line of selected characteristic impedance and driven by a source S along driving line section $L_0$. A plurality of nonreactive loads $R_1$, $R_2$, $R_3$ . . . $R_{n-1}$, and $R_n$, each of the same impedance, are interconnected one with the other by line sections $L_1$, $L_2$, $L_3$ . . . $L_{n-1}$, respectively, the transmission line being terminated in terminating line section $L_n$ which, in turn, is terminated in its matched impedance $R_T$. The particular objects of this invention are obtained by determining the characteristic impedances of each of the line sections $L_1$ through $L_n$ with respect to the impedance R of the resistive loads so as to terminate each preceding line section $L_0$ through $L_{n-1}$, respectively, in a matched impedance. When the characteristic impedance of the line sections $L_0$ through $L_n$ are properly determined, a signal from source S is not reflected at any of the load junctions, A, B, C . . . $N-1$, and N.

In prior art distribution systems, line sections of a same characteristic impedance would connect adjacent load junctions A and B, B and C, etc. Accordingly, reflections of the signal would occur at each load junction A, B, C, etc., along the distribution system due to the mismatched termination of each line section. Also, improper impedance matching of adjacent line sections and the resulting reflections at the load junctions A, B, C, etc., delay normalization of electrical conditions along the distribution system, such delay being a function of the magnitude of such reflections, the electrical length of the system, and the nature of the termination and source. While the distribution system eventually stabilizes the reflections created at the load junctions A, B, C, etc., delay application of appropriate signal levels to loads R.

Severe limitations, therefore, are inherent in the prior art distribution systems due to the improper termination of each line section L and resulting reflections appearing at the load junctions A, B, C, etc., which are superimposed upon the drive signal. In accordance with this invention, the efficiency of such distribution systems is materially increased when each line section L interconnecting successive loads R is terminated in a matched impedance whereby electrical conditions along a system are instantaneously stabilized due to the elimination of reflections at each load junction. Referring to FIG. 1A, the operation of a distribution system driving a plurality of shunt loads is substantially improved and no reflections appear at load junctions A, B, C, etc. when each line section is terminated by a matched impedance defined by the driven load in parallel with the input impedance of the next line section. It is fundamental to this invention that a lossless line section of indeterminate lengths, when properly terminated in a matching impedance, is equivalent electrically to that impedance and is nonreactive. To eliminate reflections at a load junction, therefore, a next succeeding line section is designed to have a characteristic impedance which, in parallel with the impedance of the driven shunt load, terminates the preceeding line section driving such load in a matched impedance. For example, considering driving line section $L_0$ of FIG. 1A, the characteristic impedance $Z_1$ of the succeeding line section $L_1$ is determined in accordance with the expression:

$$Z_0=\frac{R_1Z_1}{R_1+Z_1}$$

where $Z_0$ is the characteristic impedance of driving line section $L_0$ and $R_1$ is the impedance of the driven load. Line section $L_1$, properly terminated, appears as a resistive load in parallel with shunt load $R_1$ on the line section $L_0$. Accordingly, no reflections appear at load junction A and a same voltage signal appears along line section $L_1$ and at load junction B. A similar procedure is followed with respect to line section $L_1$ which is loaded by shunt load $R_2$ in parallel with the next line section $L_2$, interconnecting loads $R_2$ and $R_3$. In the case of line section $L_1$, the characteristic impedance $Z_2$ of line section $L_2$ is determined such that, properly terminated, the parallel combination thereof with shunt load $R_2$ terminates line section $L_1$ in a matched impedance $Z_1$, i.e., $$Z_1=\frac{R_2Z_2}{R_2+Z_2}$$

Again, no reflections occur at load junction B and a same voltage is applied along the line section $L_2$ to load junction C and across shunt load $R_3$.

By this design method, each succeeding line section $L_3$ through $L_{n-1}$ and, also, terminating line section $L_n$, are each terminated, in turn, in a matched impedance and no reflections appear at load junctions A through N along the distribution system. The distribution system is thus compensated such that a same magnitude of voltage signal appears at load junctions A through N. Moreover, since reflections do not appear at such load junctions, the normalization time of the distribution system is substantially zero.

As shown in FIG. 1B, the envelope of the magnitudes of the characteristic impedances of line sections $L_0$ through $L_n$ fits a translated equilateral hyperbola. As illustrated, any integral number $n$ of nonreactive shunt loads, within practical limits, can be driven along a distribution system of given length where terminating line section $L_n$ is of a given characteristic impedance $Z_n$. The characteristic impedance of $Z_n$ of the terminating line section $L_n$ is preferably large to minimize energy dissipation in the terminating resistor $R_T$. The number $n$ of shunt loads R that can be practically driven along a distribution system in accordance with this invention is a function of the characteristic impedance $Z_0$ of the driving line section $L_0$, the impedance of the shunt loads, and the characteristic impedance $Z_n$ of the terminating line section $L_n$ is given by the expression:

$$n=\frac{Z_n-Z_0}{Z_n\left(\frac{Z_0}{R}\right)}$$

In FIG. 2A, a distribution system in accordance with this invention is illustrated for driving a plurality of series resistive loads with identical currents. To facilitate an understanding of FIG. 2A, structures illustrated therein which correspond to structures in FIG. 1A have been indicated by prime characters. In FIG. 2A, a plurality of resistive loads $R'_1$, $R'_2$, $R'_3$ . . . $R'_{n-1}$, and $R'_n$ are driven by a source S′ along line section $L'_0$ and are connected by line sections $L'_1$, $L'_2$, $L'_3$ . . . $L'_{n-1}$, respectively, terminating line section being identified as $L'_n$. In this dual problem, a same current I flows in each of the loads $R'_1$ through $R'_n$; further, when each line section L′ is properly terminated, a same current I flows through each of the loads. For optimum performance, it is necessary that no reflections appear at any of the load junctions A′ through N′ or from terminating line section $L'_n$. In FIG. 2A, such conditions are created when each line section is terminated in a matched impedance defined by the impedance of the driven load in series with the input impedance of next line section, properly terminated. For example, the loading of driving line section $L'_0$ is given by the impedance of driven load $R'_1$ in series with the characteristic impedance $Z'_1$ of adjacent line section $L'_1$, properly terminated; accordingly, the impedance $Z'_1$ of line section $L'_1$ is given by $(Z'_0-R'_1)$. At this time, line section $L'_1$ is terminated by the impedance of load $R'_2$ in series with the characteristic impedance $Z'_2$ of line section $L'_2$. Considering that line section $L'_2$ is properly terminated, line section $L'_1$ is properly terminated when the characteristic impedance $Z'_2$ of line section $L'_2$ is $(Z'_1-R'_2)$. The characteristic impedances of remaining line sections $L'_3$ . . . $L'_n$ are determined in similar fashion. Since each of the line sections $L'_1$, $L'_2$, $L'_3$ . . . and $L'_n$ is properly terminated, no reflections appear at load junctions A′, B′, C′ . . . and N′ whereby normalization of the distribution system is rapidly achieved.

As shown in FIG. 2B, the envelope of the characteristic impedances Z′ of the adjacent line sections at integral values of the number $n$ of series resistive loads follows a straight line. In the case of series resistance loads distributed along a distribution system, the characteristic impedances of successive line section $L'_1$, $L'_2$ $L'_3$ . . . $L'_{n-1}$ and $L'_n$ are successively diminished, the characteristic impedance $R'_T$ of the terminating line section $L'_n$ should preferably be small to minimize the energy dissipation therein.

While the above-description has been directed to nonreactive loads, purely-resistive loads are difficult to obtain in practice; certain reactances associated with the driven loads, either shunt or series, can be compensated by design. In the case of shunt loads as shown in FIG. 1A, such stray reactances associated with the loads R are typically stray capacitances in parallel with the interconnected resistive loads. In the case of series resistive loads a shown in FIG. 2A, such stray reactances associated with the loads R′ are typically stray inductances in series with the interconnected loads.

For example, in the case of the spaced shunt loads as shown in FIG. 1A, the stray capacitance associated with the adjacent loads can be compensated. The characteristic impedance $Z_x$ of a line section interconnecting successive loads $R_x$ and $R_{x+1}$ is given, to a first approximation, by the expression:

$$Z_x=\sqrt{\frac{L_x}{C_x+C_L}}$$

where $L_x$ is the inductance per unit length, $C_x$ is the capacitance per unit length, and $C_L$ is the capacitance associated with the load resistor, also, in capacitance per unit length. Structurally, the characteristic impedance of this particular line section is given by the expression:

$$Z_s=\sqrt{\frac{L_x}{C_x}}$$

and is determined such as to provide the desired characteristic impedance $Z_x$ of such line section when interconnecting the adjacent loads $R_x$ and $R_{x+1}$ including their stray capacitances. It will be appreciated that when a line section is connected between successive loads $R_x$ and $R_{x+1}$, the capacitance $C_L$ associated with such loads reduces the structural characteristic impedance $Z_s$ to equal the desired characteristic impedance $Z_x$. As the propagation velocity $v$ of signals in the TEM mode along any line section is given by the expression:

$$V=\frac{1}{\sqrt{L_xC_x}}=\frac{1}{\sqrt{\mu\epsilon}}$$

simultaneous solution of the three previous equations yields for the structural characteristic impedance $Z_s$ of such line section:

$$Z_s=Z_x\left\{\frac{Z_xC_L}{2\sqrt{\mu\epsilon}}+\sqrt{1+\left(\frac{Z_xC_L}{2\sqrt{\mu\epsilon}}\right)^2}\right\}$$

In the dual problem presented in FIG. 2A, parasitic inductance associated with each load resistor, $L'_L$, per unit length, can be compensated. For example, a line section connecting loads $R'_x$ and $R'_{x+1}$ is designed, to a first approximation, to have a characteristic impedance given by the expression:

$$Z_x'=\sqrt{\frac{L_x'+L_L'}{C_x'}}$$

where $L'_x$ is the inductance per unit length and $C'_x$ is the capacitance per unit length of the line. However, in the case of periodic series loading, the structural characteristic impedance $Z'_s$, i.e., $$Z_s'=\sqrt{\frac{L_x'}{C_x'}}$$

is less than the designed characteristic impedance $Z'_x$. Accordingly, the structural characteristic impedance $Z'_s$ of the line section is designed to exhibit an effective characteristic impedance $Z'_x$ when inserted in the distribution system, i.e., the impedance $Z'_s$ is increased because of the load inductance $L'_L$. The actual, or structural, impedance $Z'_s$ of the line section which satisfies design considerations can be reduced to:

$$Z_s'=Z_x'\left\{\frac{-L_L'}{2Z_x'\sqrt{\mu\epsilon}}+\sqrt{1+\left(\frac{L'_L}{2Z_x'\sqrt{\mu\epsilon}}\right)}\right\}$$

The distribution system of this invention finds practical application in a tunnel diode memory matrix, for example, as illustrated in FIG. 3A. The memory matrix of FIG. 3A comprises a number of parallel word drive lines W1, W2 . . . W64 in transverse arrangement with a number of parallel bit drive lines B1, B2 . . . B64. A memory cell R is connected at each crossover point between a word drive line W and a bit drive line B. Memory cells R in corresponding bit positions are connected along sense lines S1, S2 . . . S64 to sense amplifiers SA. Each word drive line W and each bit drive line B, terminated in a terminating load $R_T$, is connected to a pulse generator PG operative to effect the necessary read, write, and interrogate operations. Each word drive line W and each bit drive line B are formed as transmission line structures in accordance with this invention, preferred structures being hereinafter described. However, numerous other transmission line structures may be advantageously employed in the practice of this invention, such structures being illustrated and described in Reference Data for Radio Engineers, fourth edition, published by the International Telephone and Telegraph Corporation.

Memory cells R are shown in more particular detail in FIG. 3B. Component values indicated are particularly suitable for a 64 x 64 memory array wherein the memory cells R comprise germanium tunnel diodes having five milliampere peak currents. Basically, each memory cell R comprises a pair of tandemly arranged resistors (each of 680 ohms) connected to word and bit drive lines W and B, respectively; also, tunnel diode T is connected to the junction of resistors R1 and R2 and through resistor R3 (130 ohms) to ground. The junction of resistors R1 and R2 and tunnel diode T is connected through a semiconductor coupling diode SD to sense line S which is connected to a sense amplifier SA. Operational currents are supplied to tunnel diode T along the word and bit drive lines W and B, for example, from pulse generators PG, respectively. The memory cell R, as designed, exhibits a relatively high resistive input impedance with respect to the characteristic impedances of the word and bit drive lines W and B, regardless of the memory state, and only minimal stray capacitance, in the order of picofarads.

The operation of memory cell R of FIG. 3B can be understood by reference to FIG. 3C wherein curve D is the composite characteristic of tunnel diode T and resistor R3 in series; curve E is the composite characteristic of coupling diode SD and one-half the impedance of sense line S in series; and curve F in the composite characteristic of the circuit described by curves D and E connected in parallel. The quiescent operating states "0" and "1," respectively, are defined by the intersection of load line M given by resistors R1 and R2 in parallel and curve F.

In the operation of the memory matrix of FIG. 3A, undistorted drive pulses (in the order of 2 volts at 200 milliamperes) of proper polarity are propagated along the word and bit lines W and B by the distribution system described with respect to FIG. 1A, the characteristic impedance of each line section being determined to compensate for both the resistance and shunt capacitance $C_L$ associated with the interconnected memory cell R.

Drive pulse sequences for effecting the memory operation are illustrated in FIG. 3D. To write a binary "1" into a memory cell R, clear pulse G is initially directed along the connected word drive line W which shifts the load line M to M′, thus switching the operation of tunnel diode T to the low voltage state; upon termination of the clear pulse G, tunnel diode T is operative in stable state "0." The coincident application of drive pulse H and H′ along the word and bit lines B and W, respectively, is effective to shift the load line from M to M″ whereby tunnel diode T switches to its high voltage state; upon termination of pulse T and H′, tunnel diode T is operative in stable state "1." Similarly, to write a binary "0," the sequence of pulses G and H along word drive line W is identical to that described for the write "1" operation; however, bit drive line B is not energized whereby the load line M is shifted to M‴. Upon termination of drive pulse F along word drive line W, tunnel diode T returns to the stable state "0."

To read out a memory cell R, pulse H is directed along the connected word drive line W to shift the load line M to M‴ and move the operation of tunnel diode T to state "1‴" on curve F. The voltage developed across diode T and resistor $R_3$ at this time is effective to bias coupled diode D into conduction, as indicated by the point "1‴" on curve E. Accordingly, an information pulse J is produced along sense line S. While tunnel diode T is operating in state "0," the shifting of load line M to M‴ in response to pulse H along word drive line W moves the operation of tunnel diode T to state "0‴" on curve F and causes the coupling diode SD to conduct only slightly, as indicated by the point "0‴" on curve E. Accordingly, a minimal noise pulse K is produced along the sense line S. Sense amplifiers SA can be appropriately strobed during a read out operation since it will be noted that the coupling diode D is driven into conduction and a noise pulse I appears along sense line S during a write "1" operation.

Word and bit drive lines W and B may each be formed as shown in FIGS. 4A and 4B, 5A and 5B, 6A and 6B, 7A and 7B, 8A and 8B. For purposes of simplification, the location of the connections to memory cells R along such transmission line structures have been indicated by dots. Each of the transmission line structures herein illustrated is designed such that the characteristic impedance is tapered in hyperbolic fashion along its length (i.e., electrically hyperbolic). Each illustrated transmission line structure comprises a metallic conducting strip MS which is spaced from a ground plane P by a dielectric material DM.

Figure 4A:
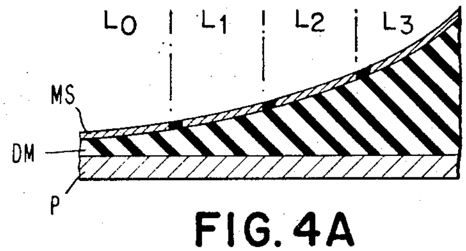
Figure 4B:
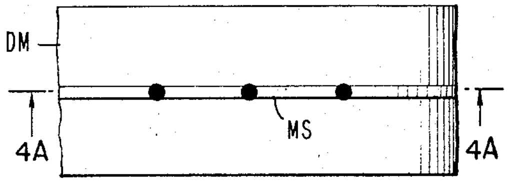
Figure 5A:
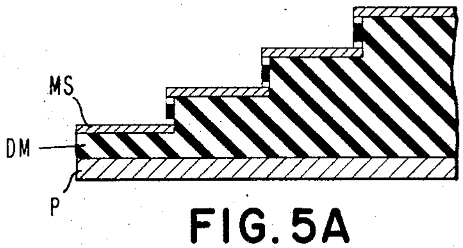
Figure 5B:
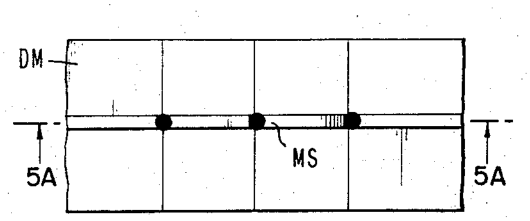
Figure 6A:
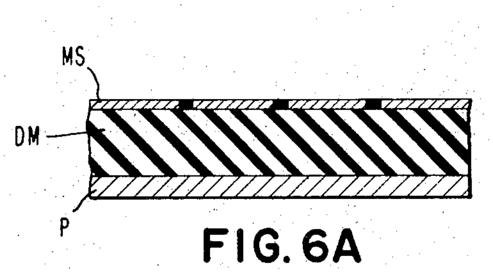
Figure 6B:
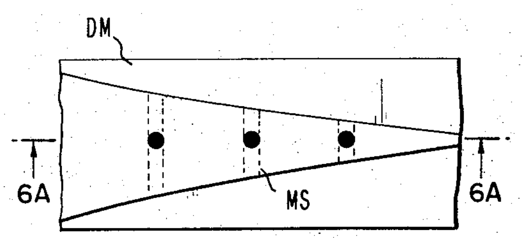
Figure 7A:
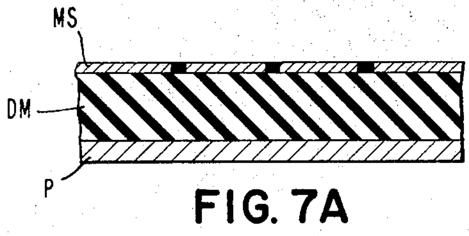
Figure 7B:
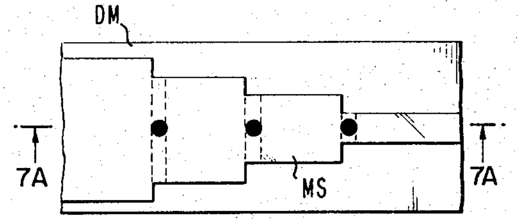
Figure 8A:
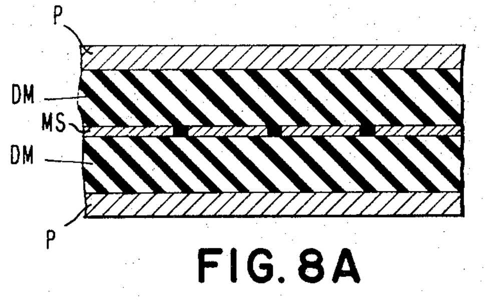
Figure 8B:
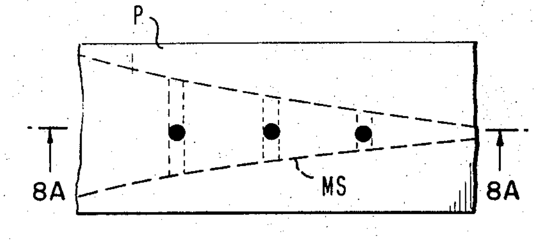

In the drawings, adjacent line sections $L_0$, $L_1$, $L_2$, $L_3$, etc., are electrically tapered such that each line section exhibits a predetermined characteristic impedance which, in parallel with the shunt resistance of an intermediate memory cell connected at the dot terminates a preceding line section with a matched impedance. In FIGS. 4A and 4B, the transmission line structure includes a strip MS of constant width and the spacing therebetween and ground plate P is varied continuously so as to impart a mean proper characteristic impedance to each line section. In FIGS. 5A and 5B, the strip MS is formed in stepped fashion to achieve the same result. Also, alternative structures shown in FIGS. 6A and 6B, and 7A and 7B, respectively, are distinguishable in that strip MS is formed in a plane parallel to that of ground plane P, the width being tapered to impart the proper characteristic impedance to each line section. The tapering of strip MS in FIGS. 6A and 6B is continuous (duality of FIGS. 4A and 4B) whereas such tapering in FIGS. 7A and 7B is effected in stepped fashion (duality of FIGS. 5A and 5B). A transmission line structure is illustrated in FIGS. 8A and 8B wherein the strip MS is located intermediate ground plane P. In such structure, the strip MS is tapered in continuous fashion to achieve the affects of this invention. It is evident that similar effects are achieved when strip MS is tapered in stepped fashion as, for example, shown in FIGS. 7A and 7B. Also, various combinations of the transmission line structures as described may be employed as word and bit drive lines W and B in the assembly of memory matrix of FIG. 3A; also, the electrical length of the individual line sections need not be equal, as shown. Accordingly, when memory cells R are connected at the locations, as defined by dots, at intersections of word and drive bit lines B and W, each line section is properly terminated whereby reflections of the drive signals propagated along the transmission line structure are eliminated at each crossover point and drive signals propagated along line sections L are applied across each memory cell R in undistorted fashion. Accordingly, drive signals of shorter duration and high repetition rates can be employed to effect the read, write, and interrogate operations whereby the access and cycle times of the memory matrix can be substantially reduced.

Also, in referring to FIGS. 4A through 8B, various distribution systems for driving a plurality of series loads can be appreciated. In accordance with the above-description, each transmission line structure would be tapered in linear fashion along its length (i.e., electrically linear) and driving signals would be applied from the high impedance end of such structure. In the series loading arrangement, the dots correspond to spaced loading effects due to the physical connection coupling of individual loads along the conductive strip MS. When the individual loads are physically connected along conductive strip MS, the individual line sections are distinct, for example, as indicated by the dashed lines of FIGS. 5B, 6B, 7B, and 8B, and are electrically continuous through the interconnected load. Also, when memory cells are formed of ferrite materials, e.g., magnetic cores, etc., the solid blocks represent the loading effect of such devices on the transmission line structure. When memory cells are thus arranged and the distribution system designed as hereinabove described, each line section is properly terminated and drive signals of substantially uniform shape are applied to each series load.

While the invention has been particularly shown and described with reference to preferred embodiments thereof, it will be understood by those skilled in the art that various changes in form and details may be made therein without departing from the spirit and scope of the invention.

What is claimed is:

1. In an electrical system, a plurality of loads, a source of electrical signals to be distributed to each of said loads, and a signal distribution system connecting said source to each of said loads, said distribution system including electrically tapered transmission line means defining a plurality of transmission line sections interconnecting successive ones of said loads and exhibiting characteristic impedances which vary monotomically as a function of distance along said transmission line means from the source.

2. In an electrical system as defined in claim 1 wherein said distribution system comprises a transmission line structure, said loads being connected in spaced fashion along said transmission line structure whereby said plurality of line sections are defined, each of said loads being connected between corresponding first and second line sections, said transmission line structure being electrically tapered to impart different characteristic impedances to each of said plurality of line sections, the characteristic impedance of each corresponding second line section being determined such that, in combination with the connected load, the corresponding first line section is terminated into a matched impedance.

3. In an electrical system as defined in claim 2 wherein said loads are connected in series along said transmission line structure.

4. In an electrical system as defined in claim 2 wherein said loads are connected in shunt along said transmission line structure.

5. In an electrical system as defined in claim 2 wherein said transmission line structure is electrically tapered in continuous fashion.

6. In an electrical system as defined in claim 2 wherein said transmission line structure is electrically tapered in stepped fashion.

7. In an electrical system as defined in claim 2 wherein each of said loads is connected in shunt along said transmission line structure, the characteristic impedance of said corresponding first line section being defined by $$\left(\frac{RZ}{R+Z}\right)$$

where R is the load impedance and Z is the characteristic impedance of said corresponding second line section such that said corresponding first line section is terminated into a matched impedance.

8. In an electrical system as defined in claim 2 wherein each of said loads is arranged in a series along said transmission line structure, the characteristic impedance of said corresponding first line section being defined by $(R+Z)$ where R is the load impedance and Z is the characteristic impedance of said corresponding second line section such that said corresponding first line section is terminated into a matched impedance.

9. In an electrical system as defined in claim 2 wherein said transmission line structure comprises a conductive strip of substantially constant width and a ground plane, the spacing between said conductive strip and said ground plane being varied to impart a different characteristic impedance to each of said line sections.

10. In an electrical system as defined in claim 2 wherein said transmission line structure comprises a conductive strip and a ground plane, said conductive strip and said ground plane being located in substantially parallel planes, the opposing surface areas of said conductive strip and said ground plane being varied to impart a different characteristic impedance to each of said line sections.

11. An electrical system for driving a memory array comprising a plurality of word and bit drive lines arranged in coordinate fashion, memory means connected at crossover points defined by corresponding word and bit drive lines, each of said word and bit drive lines being formed as transmission line structures which are electrically tapered to impart different characteristic impedances to respective sections thereof interconnecting adjacent memory means, and means for energizing selected ones of said word and bit drive lines.

12. An electrical system as defined in claim 11 wherein each transmission line structure is electrically tapered to impart a characteristic impedance to each section thereof which, in combination with the impedances of the memory means connected therebetween, terminates a preceeding section into a matched impedance.

13. An electrical system as defined in claim 11 wherein said word and bit drive lines are electrically tapered in continuous fashion to impart a different characteristic impedance to each of said respective sections.

14. An electrical system as defined in claim 9 wherein said word and bit drive line are electrically tapered in stepped fashion to impart a different characteristic impedance to each of said respective sections.

15. An electrical system as defined in claim 11 wherein each memory means is connected between first and second sections of said transmission line structures forming said corresponding word and said bit drive lines, respectively, the characteristic impedance of each first section being defined by $$\left(\frac{RZ}{R+Z}\right)$$

where R is the impedance of said each memory means with respect to said each first section and Z is the characteristic impedance of said second section in the respective transmission line structure such that said each first section is terminated into a matched impedance.

16. An electrical system for driving memory array comprising a plurality of word and bit drive lines arranged in coordinate fashion, memory means located at crossover points defined by corresponding word and bit drive lines and responsive to the concurrent energization of said corresponding word and bit drive lines, each of said word and bit drive lines being formed as transmission line structures which are electrically tapered to impart different characteristic impedances to respective sections thereof intermediate said crossover points and between adjacent ones of said memory means, and means for energizing selected ones of said word and bit drive lines.

17. An electrical system as defined in claim 16 is electrically tapered to impart a characteristic impedance to each section thereof which, in combination with the impedance of the memory means located therebetween, terminates a preceeding section into a matched impedance.

18. An electrical system as defined in claim 16 wherein said word and bit drive lines are electrically tapered in continuous fashion to impart a different characteristic impedance to each of said respective sections.

19. An electrical system as defined in claim 16 wherein said word and bit drive lines are electrically tapered in stepped fashion to impart a different characteristic impedance to each of said respective sections.

20. An electrical distribution system as defined in claim 16 wherein each memory means is located between first and second sections of said transmission line structures forming said corresponding word and bit drive lines, respectively, the characteristic impedance of each first section being defined by $(R+Z)$ where R is the impedance of said each memory means with respect to said each first section and Z is the characteristic impedance of said second section in the respective transmission line structure such that said each first section is terminated into a matched impedance.

References Cited

UNITED STATES PATENTS 3,207,976 9/1965 Stimler ............ 333—30

TERRELL W. FEARS, *Primary Examiner.*

U.S. Cl. X.R.

333—29